(12) United States Patent
Siminoff

(10) Patent No.: US 10,475,311 B2
(45) Date of Patent: Nov. 12, 2019

(54) DYNAMIC ASSESSMENT USING AN AUDIO/VIDEO RECORDING AND COMMUNICATION DEVICE

(71) Applicant: Ring Inc., Santa Monica, CA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/925,425

(22) Filed: Mar. 19, 2018

(65) Prior Publication Data

US 2018/0268674 A1  Sep. 20, 2018

Related U.S. Application Data

(60) Provisional application No. 62/473,560, filed on Mar. 20, 2017.

(51) Int. Cl.
*G08B 13/00* (2006.01)
*G08B 13/196* (2006.01)
(Continued)

(52) U.S. Cl.
CPC ......... *G08B 13/19613* (2013.01); *G08B 5/36* (2013.01); *G08B 13/19608* (2013.01); *G08B 13/19632* (2013.01); *H04N 7/186* (2013.01)

(58) Field of Classification Search
CPC .............. H04N 7/186; G08B 13/196; G08B 13/19684; G08B 13/19695; G08B 1/00; H04M 1/00
(Continued)

(56) References Cited

U.S. PATENT DOCUMENTS 4,764,953 A    8/1988  Chern et al.
5,428,388 A *  6/1995  von Bauer ............. H04N 7/186
                                                         348/155
(Continued)

FOREIGN PATENT DOCUMENTS

CN    2585521 Y    11/2003
CN    2792061 Y     6/2006
(Continued)

OTHER PUBLICATIONS

Kim, Yeonkyung, International Search Report and Written Opinion of the International Searching Authority for PCT/US/2018/023156, dated Aug. 3, 2018, International Application Division, Korean Intellectual Property Office, Republic of Korea.

*Primary Examiner* — Shirley Lu
(74) *Attorney, Agent, or Firm* — Chong IP Law, LLP

(57) ABSTRACT

Dynamic identification of threat levels associated with persons using audio/video (A/V) recording and communication devices in accordance with various embodiments of the present disclosure are provided. In one embodiment, a method for notifying a user of a threat level associated with a person within the field of view of a camera of an A/V recording and communication device is provided, the method comprising receiving, from the camera, identification data for the person; transmitting the received identification data to at least one backend server; receiving, from the backend server, information about a threat level associated with the person; and notifying the user of the threat level.

25 Claims, 14 Drawing Sheets

(51) Int. Cl.
   *G08B 5/36* (2006.01)
   *H04N 7/18* (2006.01)
(58) Field of Classification Search
   USPC ................................ 340/541; 348/152–155
   See application file for complete search history.

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1* | 8/2002 | Xin .................. G08B 13/19632 348/155 |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,872,915 | B1 | 5/2014 | Scalisi et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Scalisi |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi |
| 9,179,108 | B1 | 11/2015 | Scalisi |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 9,870,694 | B2* | 1/2018 | Eyring .............. G08B 13/1968 |
| 9,888,216 | B2* | 2/2018 | Scalisi .................. H04N 7/186 |
| 9,948,892 | B2* | 4/2018 | Siminoff .................. G08B 3/10 |
| 2002/0070858 | A1 | 6/2002 | Gutta et al. |
| 2002/0094111 | A1 | 7/2002 | Puchek et al. |
| 2002/0147982 | A1 | 10/2002 | Naidoo et al. |
| 2003/0043047 | A1 | 3/2003 | Braun |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2006/0010199 | A1 | 1/2006 | Brailean et al. |
| 2006/0022816 | A1 | 2/2006 | Yukawa |
| 2006/0139449 | A1 | 6/2006 | Cheng |
| 2006/0156361 | A1 | 7/2006 | Wang et al. |
| 2007/0008081 | A1 | 1/2007 | Tylicki et al. |
| 2007/0150827 | A1* | 6/2007 | Singh ....................... G06F 3/011 715/773 |
| 2007/0230744 | A1* | 10/2007 | Dronge ................ G08B 13/194 382/103 |
| 2010/0225455 | A1 | 9/2010 | Claiborne et al. |
| 2013/0057695 | A1 | 3/2013 | Huisking |
| 2014/0267716 | A1 | 9/2014 | Child et al. |
| 2015/0077737 | A1* | 3/2015 | Belinsky ............ G01N 15/0211 356/51 |
| 2015/0109104 | A1* | 4/2015 | Fadell .................. G08B 27/003 340/5.65 |
| 2015/0145643 | A1* | 5/2015 | Fadell .................. G06Q 10/083 340/5.51 |
| 2015/0163463 | A1 | 6/2015 | Hwang et al. |
| 2017/0337790 | A1* | 11/2017 | Gordon-Carroll ........................ G08B 13/19645 |
| 2018/0114421 | A1* | 4/2018 | Siminoff .......... G08B 13/19606 |
| 2018/0129885 | A1* | 5/2018 | Potter ................. G06K 9/00771 |
| 2018/0165933 | A1* | 6/2018 | Siminoff .................. G06K 9/00 |
| 2018/0174413 | A1* | 6/2018 | Siminoff .......... G08B 13/19628 |
| 2018/0176512 | A1* | 6/2018 | Siminoff ................ H04N 7/181 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| JP | 2009-016926 A | 1/2009 |
| KR | 10-1452874 B1 | 10/2014 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |
| WO | 2015-023405 A1 | 2/2015 |
| WO | 2016-034297 A1 | 3/2016 |

\* cited by examiner

DYNAMIC ASSESSMENT USING AN AUDIO/VIDEO RECORDING AND COMMUNICATION DEVICE

CROSS-REFERENCE TO RELATED APPLICATIONS

This application claims priority to provisional application Ser. No. 62/473,560, filed on Mar. 20, 2017. The entire contents of the priority application are hereby incorporated by reference as if fully set forth.

TECHNICAL FIELD

The present embodiments relate to automatic identification of a threat level associated with a person and/or object near a structure using audio/video (A/V) recording and communication devices (e.g., A/V recording and communication doorbell systems, A/V recording and communication security systems, etc.).

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells and security cameras, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present dynamic identification of threat level associated with a person using an audio/video (A/V) recording and communication device have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that information about a person approaching a property (or lingering within a vicinity of the property), such as the identity of the person, may be used to determine the level of a threat the person might be posing. It would be advantageous, therefore, if the functionality of an A/V recording and communication device associated with a property (e.g., installed at a house) could be leveraged to identify a person at, or near, the property. It would also be advantageous if the functionality of A/V recording and communication device could be leveraged to dynamically determine a threat level associated with the person, and provide a notification (e.g., visual and/or audible notification) to the owner of the property (and/or to residents or occupants of the property and/or to any person present at the property) about the threat level. The present embodiments provide these advantages and enhancements, as described below.

In a first aspect, a method for an audio/video (A/V) recording and communication device comprising a camera having a field of view is provided, the method for notifying a user of a threat level associated with a person within the field of view of the camera, the method comprising receiving, from the camera, identification data for the person; transmitting the received identification data to at least one backend server; receiving, from the backend server, information about a threat level associated with the person; and notifying the user of the threat level.

In an embodiment of the first aspect, notifying the user of the threat level comprises providing one of a plurality of different threat level notification types based on different threat levels.

In another embodiment of the first aspect, notifying the user of the threat level comprises providing a visual notification to the user.

In another embodiment of the first aspect, the A/V recording and communication device is associated with a structure having at least one colored light, wherein providing the visual notification comprises selecting a particular color from a set of colors for the colored light.

In another embodiment of the first aspect, each color in the set of colors corresponds to a different threat level.

In another embodiment of the first aspect, notifying the user of the threat level comprises providing an audible notification.

In another embodiment of the first aspect, notifying the user of the threat level comprises providing a notification on a user's device.

In another embodiment of the first aspect, the user's device is a smartphone.

In another embodiment of the first aspect, the A/V recording and communication device is a doorbell.

In another embodiment of the first aspect, the A/V recording and communication device is a security camera.

In another embodiment of the first aspect, receiving the identification data for the person comprises detecting a movement of the person; and capturing video images, by the camera, of the person.

In another embodiment of the first aspect, the identification data for the person comprises one or more video images of the person.

Another embodiment of the first aspect further comprises notifying other residents of a same neighborhood, in which the A/V recording and communication device is located, of the threat level.

In another embodiment of the first aspect, wherein notifying the other residents comprises notifying the other residents through streetlights located in the neighborhood.

In a second aspect, an audio/video (A/V) recording and communication device is provided, the A/V recording and communication device comprising a camera configured to record video image data of an area about the A/V recording and communication device; one or more processors; a communication module configured to transmit streaming video to a client device; and a non-transitory machine readable medium storing a program which when executed by at least one of the processors notifies a user of a threat level associated with a person within a field of view of the camera, the program comprising sets of instructions for receiving, from the camera, identification data for the person; transmitting the received identification data to at least one backend server; receiving, from the backend server, information about a threat level associated with the person; and notifying the user of the threat level.

In an embodiment of the second aspect, the set of instructions for notifying the user of the threat level comprises a set of instructions for providing one of a plurality of different threat level notification types based on different threat levels.

In another embodiment of the second aspect, the set of instructions for notifying the user of the threat level comprises a set of instructions for providing a visual notification.

In another embodiment of the second aspect, the A/V recording and communication device is associated with a structure having at least one colored light, wherein the set of instructions for providing the visual notification comprises a set of instructions for selecting a particular color from a set of different colors for the colored light.

In another embodiment of the second aspect, each color in the set of colors corresponds to a different threat level.

In another embodiment of the second aspect, the set of instructions for notifying the user of the threat level comprises a set of instructions for providing an audible notification to the user.

In another embodiment of the second aspect, the set of instructions for notifying the user of the threat level comprises a set of instructions for providing a notification on a client device.

In another embodiment of the second aspect, the client device is a smartphone.

In another embodiment of the second aspect, the A/V recording and communication device is a doorbell.

In another embodiment of the second aspect, the A/V recording and communication device is a security camera.

In another embodiment of the second aspect, the set of instructions for receiving the identification data for the person comprises sets of instructions for detecting a movement of the person within the field of view of the camera; and capturing video images, by the camera, of the person and a set of other objects that are within the field of view of the camera.

In another embodiment of the second aspect, the identification data for the person comprises one or more video images of the person.

Another embodiment of the second aspect further comprises a set of instructions for notifying other persons living in a same neighborhood, in which the A/V recording and communication device is located, of the threat level.

In another embodiment of the second aspect, the set of instructions for notifying the other persons comprises a set of instructions for notifying the other persons through streetlights located in the neighborhood.

In a third aspect, a method for identifying a threat level associated with a person within a vicinity of a structure is provided, the method comprising receiving identification data associated with the person from an audio/video (A/V) recording and communication device installed at the structure; determining whether the person is identifiable by performing a computer vision process on the received identification data; upon identification of the person, determining the threat level associated with the person; and sending the determined threat level to the A/V recording and communication device.

In an embodiment of the third aspect, the A/V recording and communication device comprises a camera, wherein the identification data comprises one or more video images of the person captured by the camera.

In another embodiment of the third aspect, the camera captures the video images of the person when the A/V recording and communication device detects a movement of the person.

In another embodiment of the third aspect, the movement of the person is detected by one or more motion sensors of the A/V recording and communication device.

In another embodiment of the third aspect, the identification data comprises at least a video image of the person captured by a camera of the A/V recording and communication device.

In another embodiment of the third aspect, performing the computer vision process comprises performing a face recognition process on the person's face included in the video image.

In another embodiment of the third aspect, determining the threat level associated with the person comprises comparing the person's face with a plurality of faces stored in a database to identify the threat level associated with the person.

Another embodiment of the third aspect further comprises, when the person is not identified, assigning a particular value to the threat level associated with the person to indicate that the person was not identifiable.

In another embodiment of the third aspect, upon receiving the determined threat level, the A/V recording and communication device notifies a user of the threat level.

In another embodiment of the third aspect, notifying the user of the threat level comprises providing a visual notification to the user.

In another embodiment of the third aspect, providing the visual notification comprises selecting a particular color from a set of different colors for a colored light within the structure, wherein each color in the set of colors corresponds to a different threat level.

In another embodiment of the third aspect, the A/V recording and communication device installed at the structure is one of a doorbell and a security camera.

In another embodiment of the third aspect, the method is performed by a smart-home hub device.

In another embodiment of the third aspect, the method is performed by a backend server.

In a fourth aspect, a non-transitory machine readable medium of a server is provided, the non-transitory machine readable medium storing a program which when executed by at least one processing unit of the server identifies a threat level associated with a person within a vicinity of a structure, the program comprising sets of instructions for receiving identification data associated with the person from an audio/video (A/V) recording and communication device installed at the structure; determining whether the person is identifiable by performing a computer vision process on the received identification data; upon identification of the person, determining the threat level associated with the person; and sending the determined threat level to the A/V recording and communication device.

In an embodiment of the fourth aspect, the A/V recording and communication device comprises a camera, the identification data comprises one or more video images of the person captured by the camera.

In another embodiment of the fourth aspect, the camera captures the video images of the person when the A/V recording and communication device detects a movement of the person.

In another embodiment of the fourth aspect, the movement of the person is detected by one or more motion sensors of the A/V recording and communication device.

In another embodiment of the fourth aspect, the identification data comprises at least a video image of the person captured by a camera of the A/V recording and communication device.

In another embodiment of the fourth aspect, the set of instructions for performing the computer vision process comprises a set of instructions for performing a face recognition process on the person's face included in the video image.

In another embodiment of the fourth aspect, the set of instructions for determining the threat level associated with the person comprises a set of instructions for comparing the person's face with a plurality of faces stored in a database to identify the threat level associated with the person.

In another embodiment of the fourth aspect, the program further comprises a set of instructions for, when the person is not identified, assigning a particular value to the threat level associated with the person to indicate that the person was not identifiable.

In another embodiment of the fourth aspect, upon receiving the determined threat level, the A/V recording and communication device notifies a user of the threat level.

In another embodiment of the fourth aspect, notifying the user of the threat level comprises providing a visual notification to the user.

In another embodiment of the fourth aspect, providing the visual notification comprises selecting a particular color from a set of different colors for a colored light within the structure, wherein each color in the set of colors corresponds to a different threat level.

In another embodiment of the fourth aspect, the A/V recording and communication device installed at the structure is one of a doorbell and a security camera.

BRIEF DESCRIPTION OF THE DRAWINGS

The various embodiments of the present dynamic identification of the threat level associated with a person using audio/video (A/V) recording and communication devices now will be discussed in detail with an emphasis on highlighting the advantageous features. These embodiments depict the novel and non-obvious A/V recording and communication devices shown in the accompanying drawings, and the methods which can be performed with them, which are for illustrative purposes only. These drawings include the following figures, in which like numerals indicate like parts.

DETAILED DESCRIPTION

Figure 1:
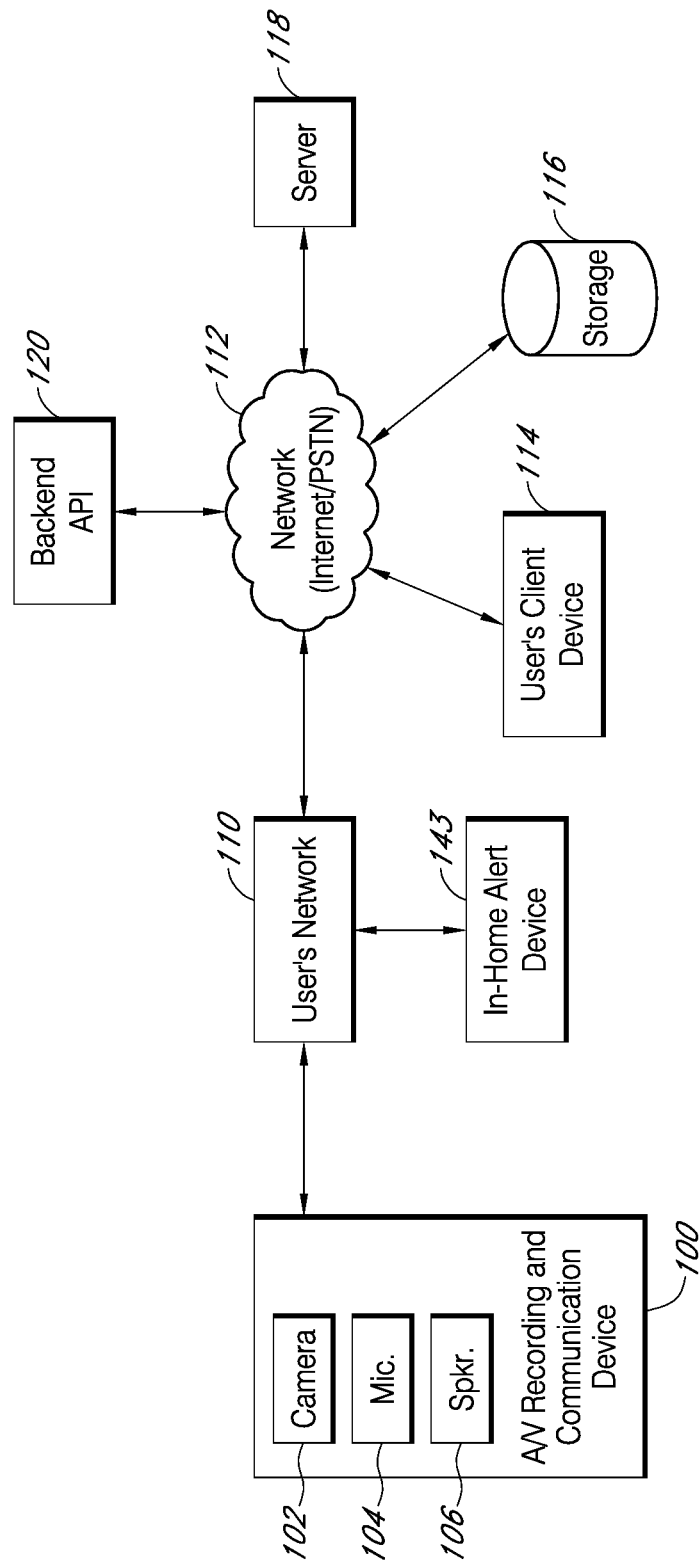
FIG. 1 is a functional block diagram illustrating a system for streaming and storing A/V content captured by an A/V recording and communication device, and for providing to a user an indication of a threat level, according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present dynamic identification of the threat level associated with a person using audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100 (e.g., a video doorbell, a security camera, etc.). While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera, as described below with reference to FIG. 8, may include substantially all of the structure and functionality of the doorbells described herein, but without the front button and its related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc.

Additionally, the present disclosure provides numerous examples of methods and systems including A/V recording and communication devices that are powered by a connection to AC mains, but the present embodiments are equally applicable for A/V recording and communication devices that are battery powered. The A/V recording and communication device 100 may further include similar componentry and/or functionality as the wireless communication doorbells described in U.S. Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The A/V recording and communication device 100 may also communicate with one or more remote storage device(s) 116 (may be referred to interchangeably as "cloud storage device(s)"), one or more servers 118, and/or a backend API (application programming interface) 120 via the network 110 (e.g., a personal wired or wireless network) and the network 112 (e.g., Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The user's network 110 is also connected to one or more alert devices such as the in-home alert device 143. The alert device 143 comprises a device that is capable of providing audible and/or visual alerts. In some aspects of the present embodiments, the alert device 143 may comprise one or more colored light bulbs that are capable of emitting light in different colors (e.g., RGB color changing LED lights such as smart LED bulbs). The alert device 143 may also comprise one or more speakers that are capable of generating different sounds and/or verbal warnings. Some of the present embodiments may include a combination of colored lights and speakers as in-home alert devices. In yet other embodiments, the alert device 143 can be any other type of device that is capable of generating visual and/or audible alerts.

According to one or more aspects of the present embodiments, when a person (who may be referred to interchangeably as a "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence using a motion sensor, and/or by detecting that the visitor has depressed the button (e.g., a doorbell button) on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

In some aspects of the present embodiments, instead of, or in conjunction with, the above-described alert, a different type of alert may be sent to the client device 114 (e.g., generating a different type of audible and/or visual notification compared to a typical alert). The different alert may provide the user with a threat level associated with the visitor. For instance, when the visitor is determined to be a suspicious person, then instead of, or in conjunction with, a typical alert, a second, different type of alert (e.g., a loud noise, flashing the screen, or any other type of warning notification) may be sent to the client device 114 in some of the present embodiments. Additionally, in some of the present embodiments, a visual and/or verbal notification about the level of the threat associated with the visitor may be provided to any persons present at the property (e.g., by activating one or more smart LED bulbs inside a structure at the property, where the one or more smart LED bulbs are capable of emitting differently colored lights based on different levels of the threat, or verbally warning the persons present at the property using one or more speakers installed inside the property, etc.).

In some instances, the identified visitor may not pose any threat at all. For example, the identified visitor may be a parcel carrier (e.g., USPS, UPS, FedEx, etc.). Some of the present embodiments may assign a value (e.g., zero) to the threat level associated with a person who does not pose a threat, such as a parcel carrier or a neighbor, and provide a notification that corresponds to such a threat level, or absence of threat, (e.g., a light emitting a color associated with safety, such as green). Similarly, when the visitor is not identifiable, some of the present embodiments may assign a value to the threat level associated with the unidentified person to indicate that the visitor could not be recognized and provide a corresponding notification (e.g., a light emitting a color associated with caution, such as yellow).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

As an example, in some of the present embodiments, one or more API servers may receive (e.g., from the A/V recording and communication device 100) captured images and/or biometric data of a person at an entry of a property and use the received images/data to determine whether the person poses a threat or not. One or more of these backend servers may employ a set of computer vision processes (e.g., face recognition, iris recognition, or any other biometrics recognition process) on one or more databases (e.g., a database for convicted felons, registered sex offenders, etc.) to recognize and report the severity of the threat (e.g., the threat level associated with the person).

The system 100 may further include a smart-home hub device (not shown) connected to the Network (Internet/PSTN) 112 via the user's network 110. A smart-home hub (also known as a home automation hub) device may comprise any device that facilitates communication with and control of one or more second devices, such as, but not limited to the in-home alert device 143, and/or the first A/V recording and communication device 100. For example, the smart-home hub device may be a component of a home security system and/or a home automation system (may be a combined home security/automation system). Where the smart-home device is a component of a home security system, the smart-home hub device may be a premises security system hub device. In some embodiments, the smart-home hub device may receive (e.g., from the A/V recording and communication device 100) captured images and/or biometric data of a person at an entry of a property and use the received images/data to determine whether the person poses a threat or not. Further, the smart-home hub device, instead of or in addition to the backend servers, may employ the set of computer vision processes (e.g., face recognition, iris recognition, or any other biometrics recognition process) on one or more databases (e.g., a database for convicted felons, registered sex offenders, etc.) to recognize and report the severity of the threat (e.g., the threat level associated with the person). In some embodiments, the smart-home hub device, may perform all or any portion of the processes performed by the backend devices, such as the backend server 118, in dynamically identifying a threat level associated with a person, as described herein.

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

As discussed above, there is a significant need to identify visitors at, or near, a property dynamically (e.g., without human intervention) and to notify persons associated with the property (e.g., owners, residents, occupants, guests, etc.) about the severity of the threat posed by the visitor. It would be advantageous, therefore, if the functionality of A/V recording and communication devices (e.g., A/V doorbells, A/V security cameras, etc.) could be leveraged to identify the visitor, determine a level of threat associated with the visitor, and notify people at the property (e.g., through in-home alert devices) and/or other authorized users remote from the property (e.g., through one or more client devices). The present embodiments provide these advantages and enhancements, as described below.

In some embodiments, the threat assessment may be performed with respect to an object instead of, or in addition to, a visitor. For example, a visitor approaching a property may be carrying an object, and the threat assessment may include an analysis of the carried object to determine if it is a weapon or any other type of object that may be dangerous and/or threatening. In another example, an object may be placed on or near a property, and the threat assessment may include an analysis of the object to determine if it is a bomb or any other type of object that may be dangerous and/or threatening.

For example, some of the present embodiments may identify one or more visitors by receiving image data of the visitor(s) within a field of view of the camera of the A/V recording and communication device. Upon determining the threat level associated with each visitor (or upon determining that the threat level associated with a given visitor cannot be ascertained), some aspects of the present embodiments may provide a notification about the identified visitor and the level of threat the visitor poses. As an example, one aspect of the present embodiments turns the color of the light(s) (e.g., at least one light) inside a structure, such as a house at which the A/V recording and communication device is installed, to (i) a first color (e.g., green) when a visitor at the front door is a trusted person (e.g., a family member or a friend) known to a person associated with the property, (ii) a second color (e.g., yellow) when the visitor is not known to the person associated with the property and/or could not be identified, (iii) a third color (e.g., red) when the visitor is a known criminal and/or a known threat (e.g., a hostile neighbor), (iv) a fourth color (e.g., orange) when the visitor could not be identified but the visitor is engaged in a suspicious activity, and (v) a fifth color (e.g., blue) when the visitor is someone not personally known to the person associated with the property but is nevertheless unlikely to pose a threat (e.g., a parcel carrier).

In various embodiments, the aspects described above (e.g., detecting a visitor, capturing video images of the visitor, identifying the visitor, determining the threat level posed by the visitor, and notifying at least one person associated with the property (e.g., using in-home alert device(s) and/or client device(s))) can be performed either entirely by the A/V recording and communication device, or by the A/V recording and communication device in conjunction with one or more backend devices (e.g., servers) using one or more backend processors, one or more databases, and/or one or more networks enabling communication between the devices in the described system.

Some of the present embodiments may comprise computer vision for one or more aspects, such as recognition of persons and/or objects. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of a person or an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Facial recognition, and shape recognition technology (SRT)—differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 12, embodiments of the present A/V recording and communication device 130 may include a computer vision module 189. The computer vision module 189 may include any of the components (e.g., hardware) and/or functionality described herein with respect to computer vision, including, without limitation, one or more cameras, sensors, and/or processors. In some embodiments, the microphone 158, the imager 171, and/or the camera processor 170 may be components of the computer vision module 189.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D image, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the computer vision module 189). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 169, and/or the camera 134 and/or the processor may receive information about the person using any one, or any combination of more than one, of the foregoing biometrics.

Figure 2:
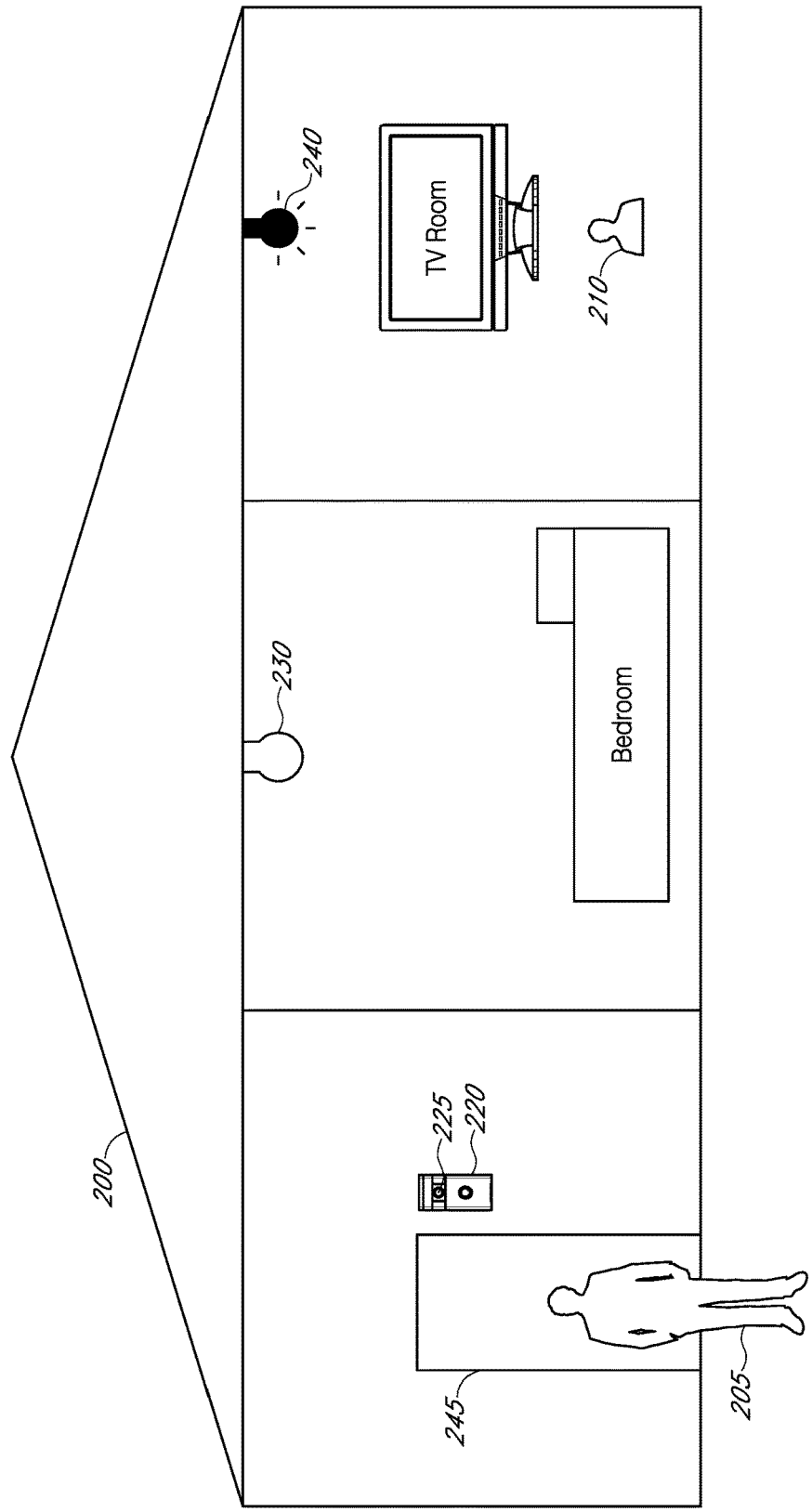
FIG. 2 is a schematic diagram of a structure, illustrating an example of notifying a person within the structure about a person at the entrance of the structure and the threat (if any) he or she might pose, according to some aspects of the present embodiments.

FIG. 2 illustrates an example of notifying a person at a property about a visitor at the entrance to a structure on the property and the threat (if any) the visitor might pose, according to some aspects of the present embodiments. The present embodiments are not limited to notifying any particular person or class of persons. The person notified about the visitor may be, for example, the owner of the property, a resident of the property, an occupant of the property, any person present at the property when the visitor is also present, any authorized user of the A/V recording and communication device (even if the authorized user is not present at the property when the visitor is also present), or any other person. Examples of the present embodiments may be described herein with respect to a particular person or class of persons, but any such examples should not be construed as limiting the present embodiments to notifying any particular person(s) or class of persons to the exclusion of notifying any other person(s) or class of persons.

With reference to FIG. 2, the present embodiments comprise an A/V recording and communication device 220 (e.g., a video doorbell, a security camera, etc.) detecting a person 205 (may also be referred to as "visitor") standing near an outside door 245 of a structure, such as a house 200, and providing an alert to a person 210 (may also be referred to as "resident") watching TV inside the house 200, wherein the alert also provides the person 210 with information about the severity of a threat the visitor 205 might pose to the person 210. As shown, the house is equipped with a set of smart LED light bulbs 230, 240 (e.g., one light bulb in each room) that are capable of emitting light in different colors. While FIG. 2 shows a house 200, the present embodiments are not limited to houses. Rather, the present embodiments are applicable to any type of property and/or structure, including without limitation houses, apartments, offices, businesses, storage facilities, etc. In fact, certain of the present embodiments are applicable to broader environments, such as neighborhoods, as further described below.

With reference to FIG. 2, when the A/V recording and communication device 220 detects the visitor 205's presence, the device 220 captures video images of persons and/or objects that are within a field of view of the camera 225 of the A/V recording and communication device 220. The A/V recording and communication device 220 may also capture audio through the device's microphone. As described above, the A/V recording and communication device 220 may detect the visitor 205's presence by detecting motion using its camera 225 and/or one or more motion sensors. The A/V recording and communication device 220 may also detect the visitor 205's presence when the visitor 205 presses a front button of the A/V recording and communication device 220 (e.g., when the A/V recording and communication device 220 is a video doorbell).

As soon as the visitor's presence is detected (through any of the above-mentioned methods), the A/V recording and communication device 220 may send a notification (along with streaming video and, in some embodiments, audio) to a client device as described below with reference to FIGS. 9 and 10. Various aspects of the present embodiments may also notify any persons inside the property of a threat level associated with the detected visitor 205. For example, some aspects of the present embodiments, instead of, or in conjunction with, a notification sent to one or more client devices, may provide a different type of alert that is indicative of a threat level associated with the visitor.

For instance, when the visitor is determined to be a criminal, instead of, or in conjunction with, a regular notification (e.g., a message along with A/V streaming sent to the client device), a second, different type of alert (e.g., a loud noise, screen flashing, or any other type of warning notification) may be sent to the client device in some of the present embodiments. Additionally, in some of the present embodiments, a visual and/or audible notification about the level of the threat associated with the visitor 205 may be sent to any persons present at the property (e.g., by activating one or more smart LED lights such as the LED lights 230 and 240, by verbally warning the residents using one or more speakers installed inside the property, etc.). When the identified visitor 205 does not pose any threat (e.g. the identified person is a family member), some of the present embodiments may assign a particular value (e.g., zero) to the threat level associated with a non-threatening visitor and provide a notification that corresponds to such a threat level (e.g., the LED lights 230, 240 turn green). When the visitor cannot be identified, some aspects of the present embodiments may assign a different value to the threat level associated with the unidentified person to indicate that the visitor could not be recognized and provide a corresponding notification (e.g., the LED lights 230, 240 turn yellow).

The smart LED lights 230, 240 are merely one example of a notification device (e.g., the in-home alert device 143 shown in FIG. 1) that can be used in connection with the present embodiments to provide a notification or warning to any persons inside the structure 200 of the threat level associated with the visitor 205. Other examples of the in-home alert device 143 include discrete devices that may be located anywhere throughout the structure 200, such as devices that may be placed on tabletops or shelves, and which may include different modes of providing notifications, such as display screens, multi-colored lights, speakers for audio notifications, etc. Any of these notification devices, including the smart LED lights 230, 240, may be configured to communicate with other devices through wired and/or wireless connections through the user's network 110 (FIG. 1) and/or the network 112, and/or through direct communication with other devices using one or more short-range communication protocols, such as Bluetooth, Bluetooth low energy (LE), ANT, ANT+, ZigBee, etc.

In order to identify a visitor and determine a threat level associated with the visitor, the A/V recording and communication device 220 of some of the present embodiments may send (e.g., through wired and/or wireless networks) the visitor's identification data (e.g., a set of images taken of the visitor) to one or more backend devices and/or services (e.g., backend servers). The servers, in turn, may identify the visitor (e.g., using one of the above-described AIDC or computer vision methods) and assign a threat level to the visitor using one or more databases (e.g., databases of authorized visitors, criminals, suspicious persons, etc.). For example, with reference to FIGS. 1 and 12, information received by the computer vision module 189 of the A/V recording and communication device 220 may be sent to one or more network devices, such as the server 118 and/or the backend API 120 (e.g., in a computer vision query signal) to query about the threat level associated with a visitor. In some aspects of the present embodiments, however, the A/V recording and communication device 220 may make such a determination itself and without exchanging identification data with backend devices. In yet other aspects of the present embodiments, the identification of the visitor and the threat level associated with the visitor may be determined by a combination of the A/V recording and communication device 220 and one or more backend devices.

In some aspects of the present embodiments, the information sent to the backend devices and/or services may be compared with other information stored in one or more databases to determine whether there is a match. For example, one or more images (and/or other biometric data) of the visitor may be compared with photos and/or images (and/or other biometric data) of known suspicious persons, criminals, etc. If there is a match, a level of threat may be retrieved from the databases, or assigned by the servers based on which database contained a match for the visitor. For example, if the visitor is matched against a criminal or suspicious persons' database, the level of threat assigned to the visitor may be set to the highest level. Conversely, when the visitor is matched against a known and authorized persons' database, the level of threat assigned to the visitor may be set to the lowest level. When the visitor cannot be identified (e.g., cannot be matched against any of the databases), an unknown visitor status (or threat level) may be assigned to the visitor in some embodiments. The databases described above, and elsewhere herein, are merely examples, and should not be construed as limiting. In some embodiments, information about visitors may be retrieved from a single database, or from a plurality of databases other than those described herein.

The databases may contain as much information as possible about each known suspicious person, criminal, etc., such as their facial features or characteristics, name, aliases, and/or criminal history. However, the databases may also contain as little information as an image of the face of a known suspicious person, criminal, etc., even if that person is otherwise unidentified by name or other typical identifying information. In some embodiments, the database(s) of known suspicious persons, criminal, etc. may be one or more databases of convicted felons and/or registered sex offenders. In other embodiments, the database of known suspicious persons may be modified by the user, such as through the client device. Specifically, the user may, upon review of stored images of visitors, flag a particular stored image of a visitor as suspicious or threatening. This image may then be uploaded into the database. This flagging function can further be notated by the user as a "public" suspicious or threatening person, who might be exhibiting suspicious or threatening behavior as to an entire neighborhood, such as, for example, a suspicious or threatening person that the user saw breaking a neighbor's windows, or it can be notated by the user as a "private" suspicious or threatening person, such as, for example a hostile co-worker whose presence may be suspicious or threatening with respect to the user's home, but not to the public at large.

Additionally, a user may upload one or more images of persons that the user considers suspicious or threatening into the database, from sources other than those captured by the A/V recording and communication device 220, e.g., from the user's smartphone camera. This example embodiment allows for the user to receive alerts about persons that are suspicious or threatening to the user, for example, an ex-spouse, a hostile co-worker, a hostile neighbor, etc., but who are not otherwise known to be suspicious or threatening to society at large. Furthermore, in some embodiments, a crime(s) and/or suspicious event(s) may have been recorded by an A/V recording and communication device other than the ones associated with the owner/occupant of the property. For example, another user of an A/V recording and communication device may view video footage that was recorded by his or her device and determine that the person or persons in the video footage are, or may be, engaged in suspicious or threatening activity and/or criminal activity. The other user may then share that video footage with one or more other people, such as other users of A/V recording and communication devices, and/or one or more organizations, including one or more law enforcement agencies. The present embodiments may leverage this shared video footage for use in comparing with the information in the computer vision query to determine whether a person detected in the area about the A/V recording and communication device 220 is the same person that was the subject of (and/or depicted in) the shared video footage.

After assigning a threat level value to the visitor 205, the network device(s), such as the server 118 and/or the backend API 120 (FIG. 1), may send a computer vision response signal to the A/V recording and communication device 220, which may contain the threat level assigned to the visitor. After receiving this signal, the A/V recording and communication device 220 may translate the threat level value assigned to the visitor 205 to a particular color of light to be emitted by the LED lights 230 and 240 (FIG. 2) inside the structure 200 (if the in-home alert device is a smart LED light). In some aspects of the present embodiments, the alert signals to the in-home alert devices may also be sent by the backend servers. That is, not only do the backend servers of some embodiments determine the threat level associated with a visitor, but also the servers themselves may send a threat level signal to activate the in-home alert devices directly, such as via the networks 110, 112, instead of sending the threat level signal to the A/V recording and communication device, which then relays the threat level signal to the in-home alert device(s).

Figure 14:
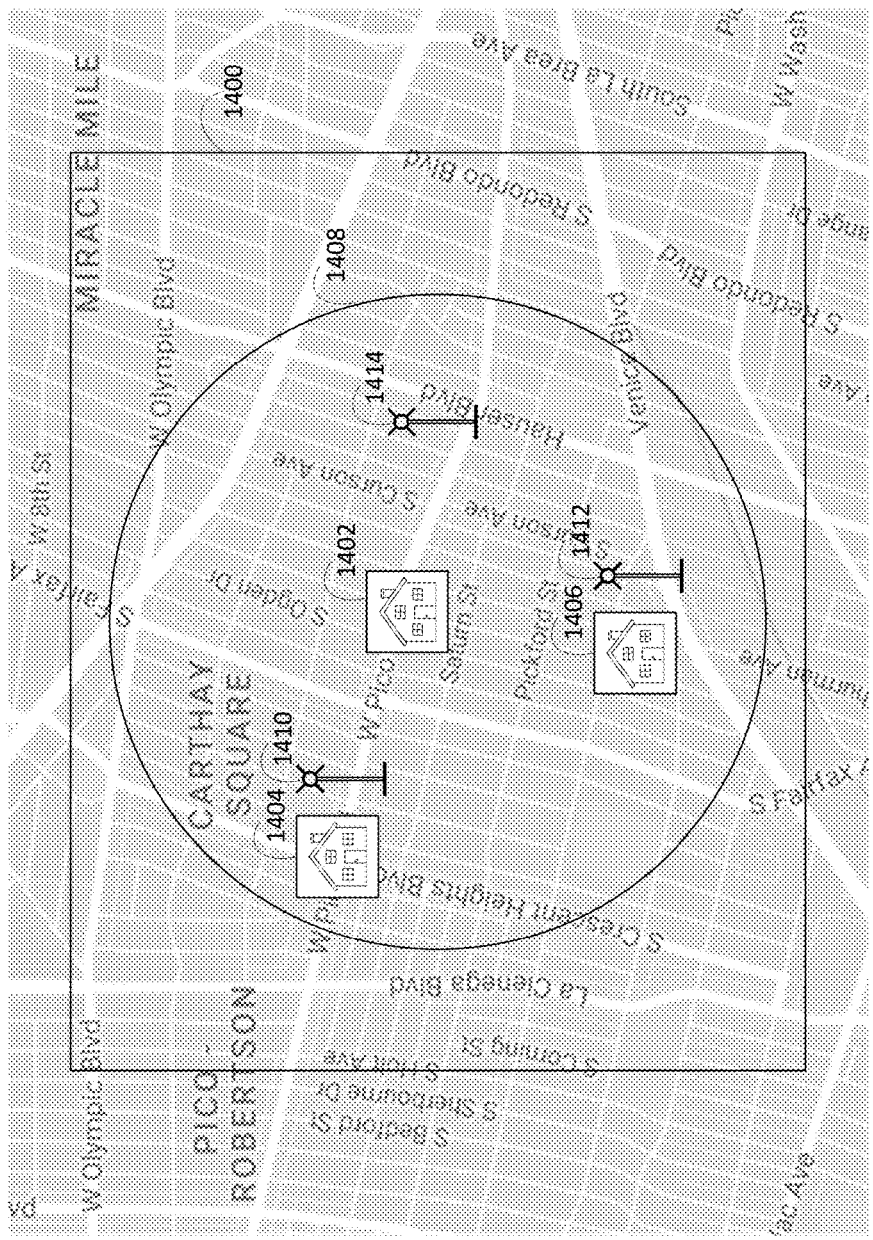
FIG. 14 is a schematic diagram illustrating an example neighborhood according to various aspects of the present disclosure.

In addition to sending alert signals to in-home notification devices and other client devices, some aspects of the present embodiments may also provide notifications that are directed to larger groups of people, such as a neighborhood when an A/V device detects a threat at a property located in the neighborhood. FIG. 14 is a schematic diagram illustrating an example neighborhood 1400 according to various aspects of the present disclosure. In some of the present embodiments, when a high-level threat is detected at a first property 1402 in a neighborhood 1400, in addition to notifying persons at the first property 1402 (and/or any remotely located authorized person(s) having a client device), some embodiments may provide audible and/or visual notifications to other persons in the neighborhood, including residents and owners of other properties 1404, 1406 that are located within a certain distance 1408 from the first property 1402 in the neighborhood 1400. In one aspect of the present embodiments, the other neighbors (and/or any persons present in the neighborhood) may be notified through the street lights 1410, 1412, 1414 installed at the neighborhood 1400. For example, the street lights 1410, 1412, 1414 may be turned on, may start flashing, may emit different colors of light, or may provide notification through any other means that will draw the neighbors' attention. Some embodiments may provide additional audible or verbal notification (e.g., through a set of speakers that are installed in the neighborhood), in addition to or instead of any visual notification.

With reference to the example illustrated in FIG. 2, after the presence of the visitor 205 is detected by the A/V recording and communication device 220 near the house 200, the device 220 may send one or more images of the visitor 205 to the backend servers in a query signal about the identification of the detected person. The servers may determine that the visitor 205 is a known and authorized person (e.g., a friend or family member) and send a response signal to the device 220 indicating that the visitor 205 is an authorized person. Subsequently, the A/V recording and communication device 220 may send a signal (e.g., through the wired and/or wireless network 110) to the LED light 240 to emit a green light in the TV room. The resident 210 watching TV in this room is notified of the presence of a known person (e.g., a friend) at the door by observing the green light in the room (even before the visitor 205 activates the doorbell 220).

In some aspects of the present embodiments, not every LED light inside the house may be activated when a notification of threat level is provided to the persons inside the structure 200. For example, in some embodiments, only the light(s) of the room (or rooms) that is/are occupied may be activated. Some of the present embodiments may determine which rooms are occupied by employing a set of motion sensors installed in the house, through detection of the client devices carried by the occupants, through other A/V recording and communication devices installed inside the house 200, etc. In the illustrated example, the LED light 240 in the TV room is activated because a person 210 is present there, while the LED light 230 in the bedroom remains inactive because no person is present there. In some other embodiments, such as the ones described below with reference to FIGS. 3 and 4, all of the lights may be activated for notifying the occupants irrespective of which room or rooms are occupied.

The A/V recording and communication device 220 of some of the present embodiments may recognize a suspicious activity conducted by a visitor and notify the owners and/or occupants of the property of a high level of threat associated with the visitor regardless of the threat level assigned to the visitor (e.g., through using the databases). That is, in some aspects of the present embodiments, when a person at, or near, a property engages in a suspicious activity, the A/V recording and communication device may send a "high level of threat" signal to the in-home alert devices (and/or to other client devices) even if the level of threat associated with the visitor was not recognizable (e.g., the visitor's identity could not be matched against any of the databases), or even when the visitor is determined to be associated with a lower level of threat (e.g., visitor is known by the owner of the property).

One example of a suspicious activity that could cause the A/V recording and communication device to send a "high level of threat" signal to the in-home alert devices and/or to other client devices is loitering. Loitering is often a prelude to a number of property and personal crimes, such as burglary, vandalism, breaking-and-entering, home invasion robbery, etc. Loitering may be identified using the several of the present embodiments in a variety of ways. For example, in some embodiments, the A/V recording and communication device 220 is configured to record and save image data of all persons who enter the field of view of the camera 225 to create saved visitor images. These saved visitor images may then be automatically compared to the images of subsequent visitors within a certain period of time. Then, using the saved visitor images and the image data from a new visitor, if it is determined that the visitor has entered the field of view of the camera more than once within a predetermined period of time (may be referred to as a "suspicious loitering time warning value"), the process may set a suspicious person warning flag and/or generate and send alerts through the in-home alert devices and/or other client devices.

Some embodiments may identify loitering as a result of a prolonged presence of the same person in the field of view of the camera 225 of the A/V recording and communication device 220. In other embodiments, the process may include determining whether the doorbell of the A/V recording and communication device 220 has been activated. Then, if the doorbell has not been activated, and the suspicious loitering time warning value has been exceeded, the process may set a warning flag. In another embodiment for identifying suspicious behavior, including loitering, the process may employ two distinct A/V recording and communication devices. This method can advantageously identify suspicious behavior, for example, in the form of a person first approaching the front door of a property and then the back door of the same property.

Figure 4:
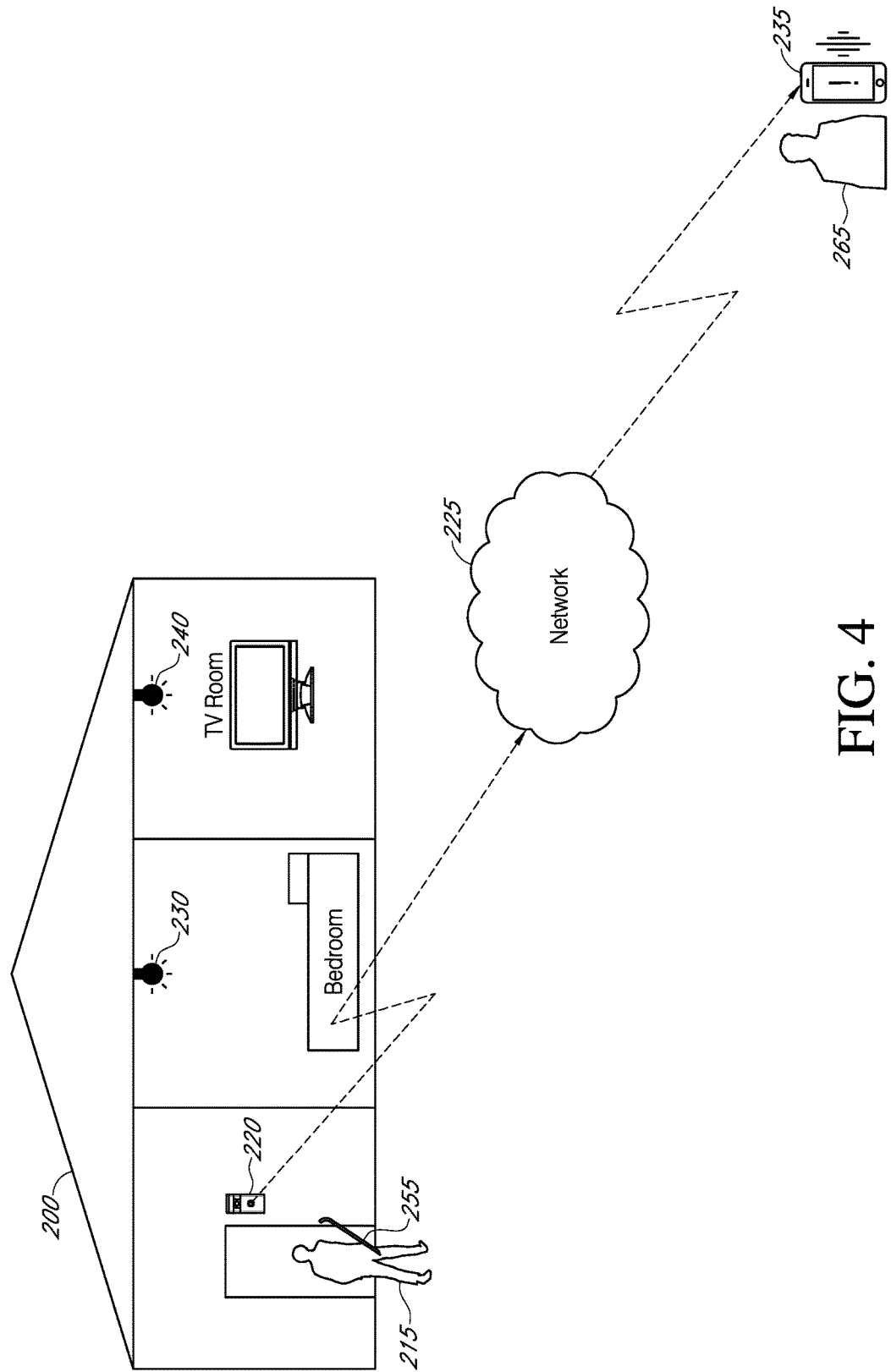
FIG. 4 is a schematic diagram of a structure, illustrating an example of notifying an authorized person associated with a property (e.g., a property owner away from the property) about a threat level posed by a person at, or near, the property, according to some aspects of the present embodiments.

Another form of suspicious behavior that can be identified by some of the present embodiments is carrying a suspicious object, such as a weapon or a burglary tool (e.g., a crowbar). The present embodiments also contemplate numerous methodologies for determining whether an object carried by a person who is present within the camera's field of view is a suspicious item, such as a weapon or burglary tool 255 (FIG. 4). Any or all of these methodologies may include one or more aspects of computer vision. For example, in some embodiments, received image data of an object carried by a person within the camera's field of view may be determined to be a suspicious item by using object recognition software to compare images received from the A/V recording and communication device 220 to a database of images of weapons and/or burglary tools and/or other types of suspicious objects. Upon determining that a person is carrying a suspicious object or a weapon, a suspicious person warning flag may be set by some of the present embodiments.

Another form of suspicious behavior is intentionally obscuring, or partially obscuring, a visitor's face, so that it cannot be seen or recognized by the A/V recording and communication device 220. In embodiments of the present methods, the facial recognition software and the object recognition software can be used to interact with one another, or to act alone, in order to determine, based on received image data of a person within the field of view of a camera 225 of the A/V recording and communication device 220, that the person has used an object to obscure or partially obscure his or her face. When the process determines that a person is in the field of view of the camera, but that the person's face is obscured, or is obscured for some predetermined period of time, or that the person's face is obscured at the time that the person activates the doorbell, a suspicious person warning flag may be set by some embodiments.

Many more examples of suspicious activities, as well as methods of dynamic recognition of suspicious persons and/or activities by an A/V recording and communication device, are provided in U.S. Provisional Patent Application Ser. No. 62/464,342, filed on Feb. 27, 2017, entitled "IDENTIFICATION OF SUSPICIOUS PERSONS USING AUDIO/VIDEO RECORDING AND COMMUNICATION DEVICES," which is incorporated herein by reference in its entirety as if fully set forth.

Figure 3:
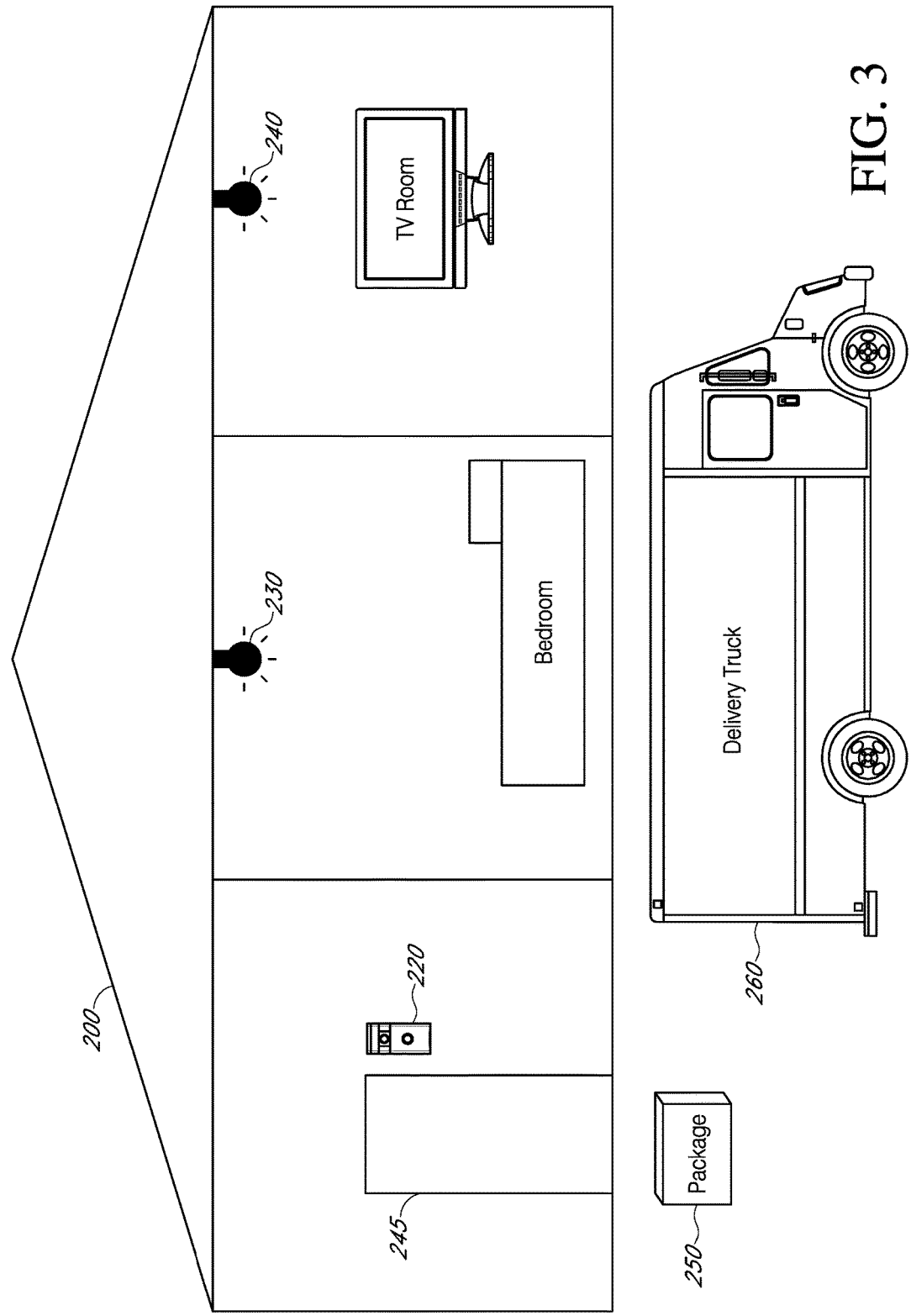
FIG. 3 is a schematic diagram of a structure, illustrating an example of notifying a person within the structure about an object placed near the entrance of the structure, according to some aspects of the present embodiments.

FIG. 3 illustrates an example of notifying persons at a property (and/or associated with the property but not necessarily present at the premises) about an object placed near the entrance of the property, according to some of the present embodiments. As discussed above, every notification of a threat level is not necessarily associated with a person or visitor near the property. Some aspects of the present embodiments may provide a threat level notification (to residents of the property, to persons present at the property, to client devices, etc.) when an object (e.g., a package) is detected at, or near, the property. FIG. 3 includes the same house 200, entry point 245 (e.g., front door), and A/V recording and communication device 220 that are shown in FIG. 2. However, in FIG. 3, instead of a person being near the entrance of the property, a package 250 is placed at the property's front door 245 by a delivery service 260.

When the package 250 is left at the door 245 (e.g., by a deliveryman), an alert may be sent to the in-home alert devices 230 and 240 (in addition to or instead of an alert sent to one or more client devices associated with the A/V recording and communication device 220). Some of the present embodiments may assign a neutral level of threat to objects other than human beings when those objects are placed near a property. In some such embodiments, when the A/V recording and communication device 220 receives a signal (e.g., from the backend servers) indicating that the object 250 is a package, the device 220 may activate the LED lights 230 and 240 to emit a neutral color light, such as, for example, blue, and/or may send an alert to one or more client devices about the presence of the package 250 at the door 245 of the house 200.

FIG. 4 illustrates an example of notifying an authorized person associated with a property (e.g., a property owner or resident away from the property) about a threat level posed by a person at, or near, the property, according to some aspects of the present embodiments. As shown in FIG. 4, an intruder 215 holding a crowbar 255 is approaching the house 200 while a person 265 (e.g., the owner of the house 200) having a client device 235, which is associated with the A/V recording and communication device 220, is away from the house 200. As described above, since a crowbar 255 can be determined to be a suspicious object, some of the present embodiments may send a high level of threat signal to both the in-home alert devices 230, 240 (to notify persons inside the house) and/or to any client device(s) 235 associated with the A/V recording and communication device 220 (whether inside the property or away from the property).

As described above, a received image of an object carried by a person within the camera's field of view may be determined to be a suspicious item by using object recognition software to compare the received image from the A/V recording and communication device 220 to one or more database(s) of images of weapons and/or other types of suspicious objects, such as burglary tools. Upon determining that the intruder 215 is carrying a suspicious object (such as the depicted crowbar 255) some of the present embodiments may activate a high-level-threat alert without attempting to determine (e.g., using other remote servers and/or databases) the identity of the person carrying the suspicious object. In yet other aspects of the present embodiments, the A/V recording and communication device 220 may send a query signal to one or more backend devices to attempt to identify the person and the threat level associated with the person carrying the suspicious object, irrespective of recognition of the suspicious object carried by the person.

As shown in FIG. 4, a serious threat level notification may be sent to the persons within the structure through the LED lights 230 and 240 inside the property by emitting a red light (or another color associated with danger). Simultaneously, a strong-threat notification may also be sent to the client device 235, while the user 265 is away from the house 200 (e.g., at work). The threat level notification may be sent to the client device 235 through one or more networks such as the user network 110 and the network 112 described above with reference to FIG. 1. When the client device 235 receives a severe threat alert, depending on the configuration of the device 235, the device 235 may provide one or more audible and/or visual notifications to the user 265. For example, a loud noise and/or a warning statement might be broadcast from the speaker(s) of the device 235 in some embodiments. In some other embodiments, a display screen of the device 235 may flash and/or one or more warning messages or popups may appear (e.g., in red or other colors) on the display screen of the device 235. In yet other embodiments, a combination of verbal and visual notifications may be provided to the user 265.

Figure 5:
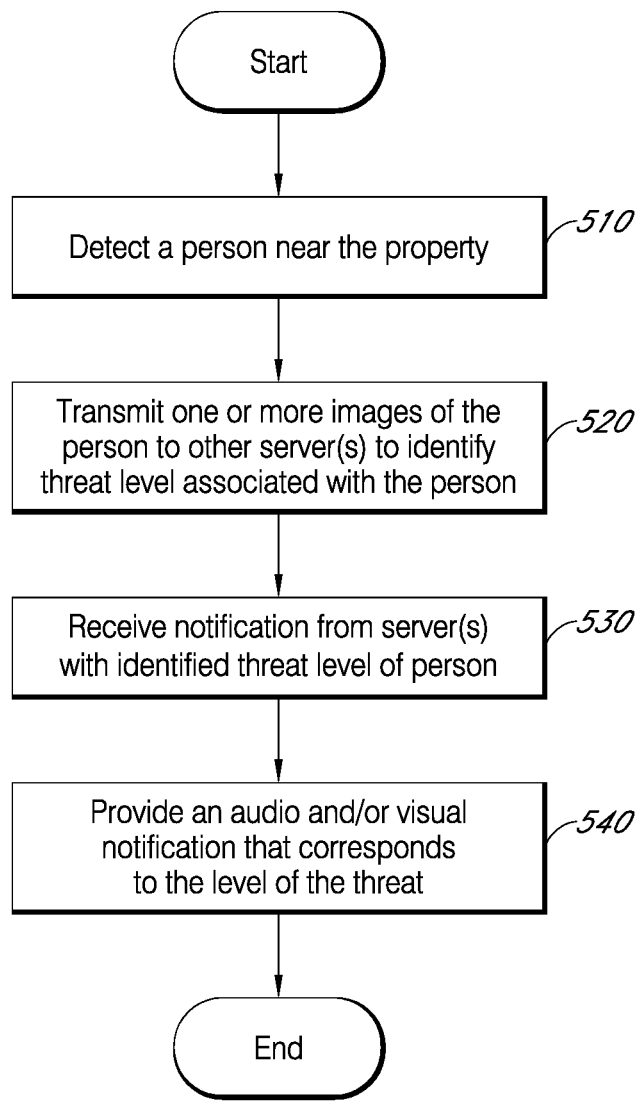
FIG. 5 is a flowchart illustrating a process for detecting a person approaching a property, determining a threat level associated with the person, and notifying one or more persons associated with the property about the threat level, according to some aspects of the present embodiments.

FIG. 5 is a flowchart illustrating a process for detecting a person approaching a property or moving around a property, determining a threat level associated with the person, and notifying one or more persons present at the property and/or associated with the property about the threat level, according to the present embodiments. In some of the present embodiments, this process may be performed by an A/V recording and communication device such as the A/V recording and communication device 220 shown in FIGS. 2-4.

At block 510, the process detects a person near a property and/or within a field of view of a camera of the A/V recording and communication device. As described above, the process may detect the visitor's presence by detecting motion using the camera and/or one or more motion sensors of the A/V recording and communication device. The process may also detect the visitor's presence when the visitor presses a doorbell button of the A/V recording and communication device (e.g., if the A/V recording and communication device is a video doorbell). As soon as the visitor's presence is detected, the process may send, at block 520, identification data to one or more servers that may be capable of identifying and/or assigning a threat level to the person. In one aspect of the present embodiments, the process may transmit one or more images to the servers to be used to recognize the person's face.

At block 530, the process receives a threat level alert back from the server(s) with an indication of the level of the threat assigned to the person. After receiving the alert, at block 540, the process translates the received alert to audio and/or visual notifications about the level of the threat associated with the person. For example, the process may activate one or more smart LED lights inside the property. These LED lights are capable of emitting different colors of light based on the severity of the threat the person may pose (e.g., a green color for authorized visitors, a red color for intruders, a yellow color for unidentified persons, etc.). Additionally, the process may provide audible notifications. For example, in some embodiments, the notification may comprise an audible alarm emitted from a speaker of the A/V recording and communication device and/or one or more speakers installed inside the house. The audible alarm may be any loud noise likely to attract attention when the person is determined to be suspicious. In some aspects of the present embodiments, a verbal notification corresponding to the level of threat may be provided to the residents. For example, the verbal notification may inform the residents of the house about a friend, an unidentified person, a criminal, or a suspicious person being at the door of the house.

In some aspects of the present embodiments, the backend server itself may provide the audible and/or visual notification(s) (e.g., the server may activate the light(s) inside the structure directly and without intervention of the A/V recording and communication device). Further, in some aspects of the present embodiments, the process may also provide a user, associated with a client device, with different audible and visual notifications. That is, the process may transmit an alert to a client device associated with the A/V recording and communication device. For example, the alert may be transmitted from the A/V recording and communication device to the user's client device via the user's network 110 and/or the network 112.

The alert may include streaming video images of the person(s) who was/were determined to have been suspicious. The user can then determine whether to take further action, such as alerting law enforcement and/or sharing the video footage with other people, such as via social media. The process of some embodiments may also provide further visual and/or audible alerts to draw the user's attention to the client device (e.g., emitting a loud noise from the speaker of the client device, flashing the display screen of the client device, etc.).

Figure 6:
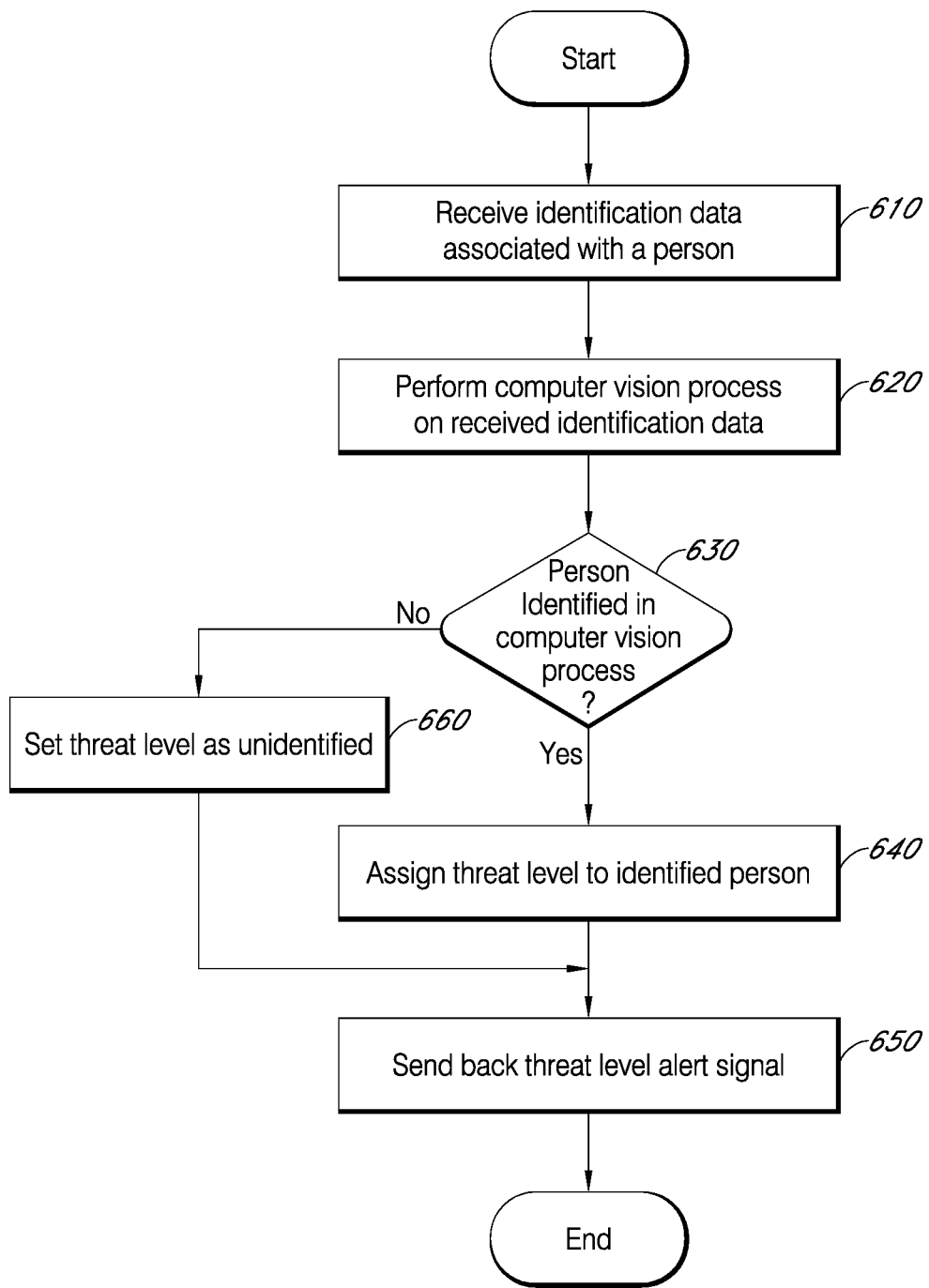
FIG. 6 is a flowchart illustrating a process for receiving identification data about a person at, or near, a property and determining a threat level associated with the person, according to some aspects of the present embodiments.

FIG. 6 is a flowchart illustrating a process for receiving identification data about a person at, or near, a property and determining a threat level associated with the person, according to the present embodiments. In some of the present embodiments, the process described with reference to FIG. 6 may be performed by one or more backend devices (e.g., backend APIs and/or servers). The process initiates by receiving (at block 610) identification data associated with a person. As described above, the person might be a visitor at, or near, a property. The process may receive the identification data for the person from an A/V recording and communication device, such as a video doorbell or a security camera. For example, in some aspects of the present embodiments, block 610 is the next operation after block 520 with reference to FIG. 5 described above. That is, the process may receive one or more video images of the person from an A/V recording and communication device after the A/V recording and communication device detects the person and captures images of the person.

After receiving the identification data, at block 620, the process performs a computer vision process on the received identification data to identify the person. As described above, the computer vision process may include face recognition, and/or any other biometrics recognition process. For example, in a face recognition process, the face of the person is compared with different databases of known persons, authorized persons, criminals, etc., as described above, in order to assign a threat level to the person. At block 630, the process determines whether the person was identified through the computer vision process (e.g., whether a match for the received identification data was found in any of the databases). When the process determines that no match was found, the process of some embodiments assigns (at block 660) an "unidentified" threat level to the person.

However, when the process is able to match the person against one or more of the databases, the process of some embodiments assigns (at block 640) a threat level to the identified person that may correspond to the database in which the person is found. For example, if the person is found in a convicted felons database, a high level of threat may be assigned to the person. At block 650, the process returns an alert back to the A/V recording and communication device, wherein the alert includes the assigned threat level associated with the detected person.

Many of the present embodiments have been described with reference to persons detected by, or present in the area about, the A/V recording and communication device 130. The present embodiments are not limited, however, to scenarios involving humans. For example, the present embodiments contemplate that suspicious behavior may be committed by a bot or drone. In some instances, the mere presence of a bot or drone will be identified as suspicious, in other instances, loitering by a drone will be identified as suspicious.

Figure 7:
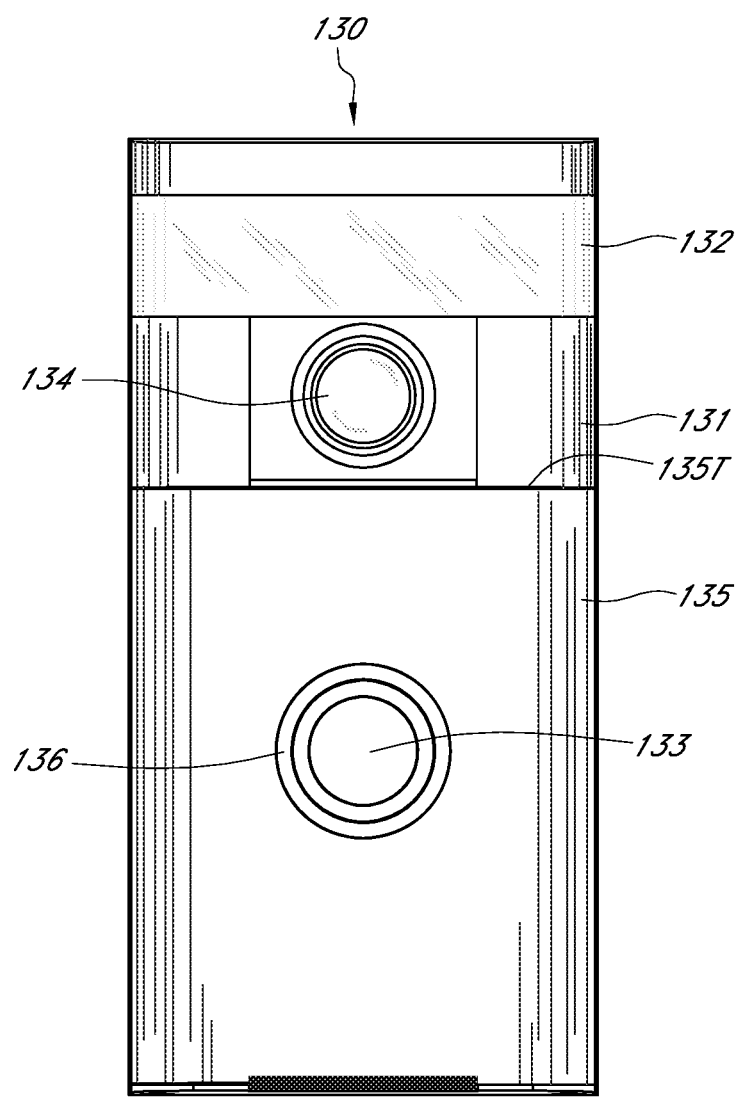
FIG. 7 is a front view of an A/V recording and communication doorbell according to an aspect of the present disclosure.

FIG. 7 is a front view of an A/V recording and communication doorbell according to an aspect of the present disclosure. FIG. 7 illustrates that the front of the video doorbell 130 includes a front button 133, a faceplate 135, and a light pipe 136. The button 133 may make contact with a button actuator (not shown) located within the doorbell 130 when the button 133 is pressed by a visitor. When pressed, the button 133 may trigger one or more functions of the doorbell 130, as further described below. The front button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's) 156 (FIG. 12), contained within the doorbell 130. In some aspects of the present embodiments, when the battery 166 of the doorbell 130 is recharged through a connection to AC mains power, the LEDs 156 may emit light to indicate that the battery 166 is being recharged.

With further reference to FIG. 7, the doorbell 130 further includes an enclosure 131 that engages the faceplate 135 in some aspects of the present embodiments. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described above and below.

Figure 8:
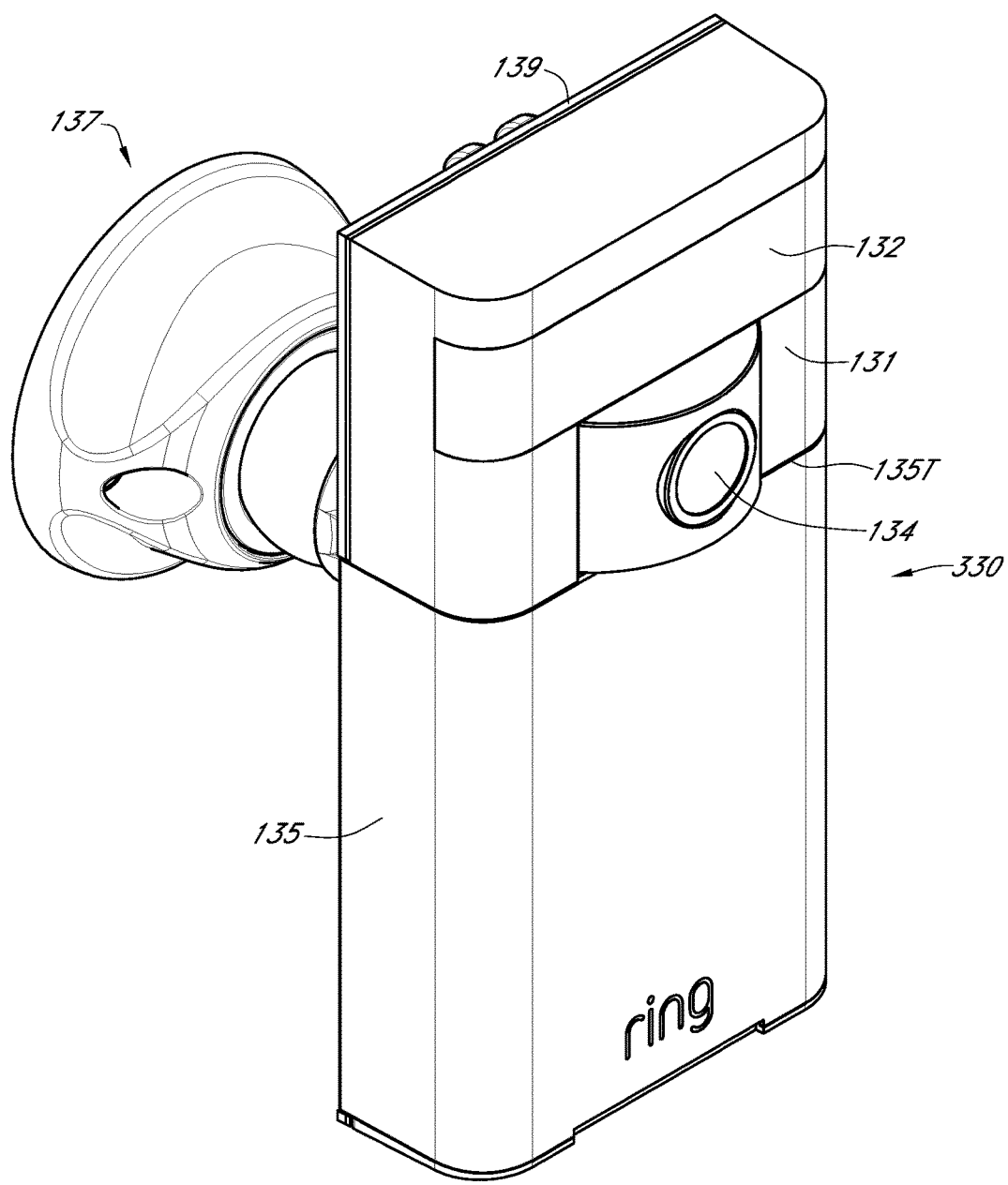
FIG. 8 is an upper front perspective view of an A/V recording and communication security camera according to an aspect of the present disclosure.

FIG. 8 is an upper front perspective view of a security camera according to an aspect of the present embodiments. This figure illustrates that the security camera 330, similar to the video doorbell 130, includes a faceplate 135 that is mounted to a back plate 139 and an enclosure 131 that engages the faceplate 135. Collectively, the faceplate 135, the back plate 139, and the enclosure 131 form a housing that contains and protects the inner components of the security camera 330. However, unlike the video doorbell 130, the security camera 330 does not include any front button 133 for activating the doorbell. The faceplate 135 may comprise any suitable material, including, without limitation, metals, such as brushed aluminum or stainless steel, metal alloys, or plastics. The faceplate 135 protects the internal contents of the security camera 330 and serves as an exterior front surface of the security camera 330.

With continued reference to FIG. 8, the enclosure 131 engages the faceplate 135 and abuts an upper edge 135T of the faceplate 135. As discussed above with reference to FIG. 7, in alternative embodiments, one or more gaps between the enclosure 131 and the faceplate 135 may facilitate the passage of sound and/or light through the security camera 330. The enclosure 131 may comprise any suitable material, but in some embodiments the material of the enclosure 131 preferably permits infrared light to pass through from inside the security camera 330 to the environment and vice versa. The security camera 330 further includes a lens 132. Again, similar to the video doorbell 130, in some embodiments, the lens may comprise a Fresnel lens, which may be patterned to deflect incoming light into one or more infrared sensors located within the security camera 330. The security camera 330 further includes a camera 134, which captures video data when activated, as described above and below.

With reference to FIG. 8, the enclosure 131 may extend from the front of the security camera 330 around to the back thereof and may fit snugly around a lip (not shown) of the back plate 139. The back plate 139 may comprise any suitable material, including, without limitation, metals, such as brushed aluminum or stainless steel, metal alloys, or plastics. The back plate 139 protects the internal contents of the security camera 330 and serves as an exterior rear surface of the security camera 330. The faceplate 135 may extend from the front of the security camera 330 and at least partially wrap around the back plate 139, thereby allowing a coupled connection between the faceplate 135 and the back plate 139. The back plate 139 may have indentations (not shown) in its structure to facilitate the coupling.

With continued reference to FIG. 8, the security camera 330 further comprises a mounting apparatus 137. The mounting apparatus 137 facilitates mounting the security camera 330 to a surface, such as an interior or exterior wall of a building, such as a home or office. The faceplate 135 may extend from the bottom of the security camera 330 up to just below the camera 134, and connect to the back plate 139 as described above. The lens 132 may extend and curl partially around the side of the security camera 330. The enclosure 131 may extend and curl around the side and top of the security camera 330, and may be coupled to the back plate 139 as described above. The camera 134 may protrude from the enclosure 131, thereby giving it a wider field of view. The mounting apparatus 137 may couple with the back plate 139, thereby creating an assembly including the security camera 330 and the mounting apparatus 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 9:
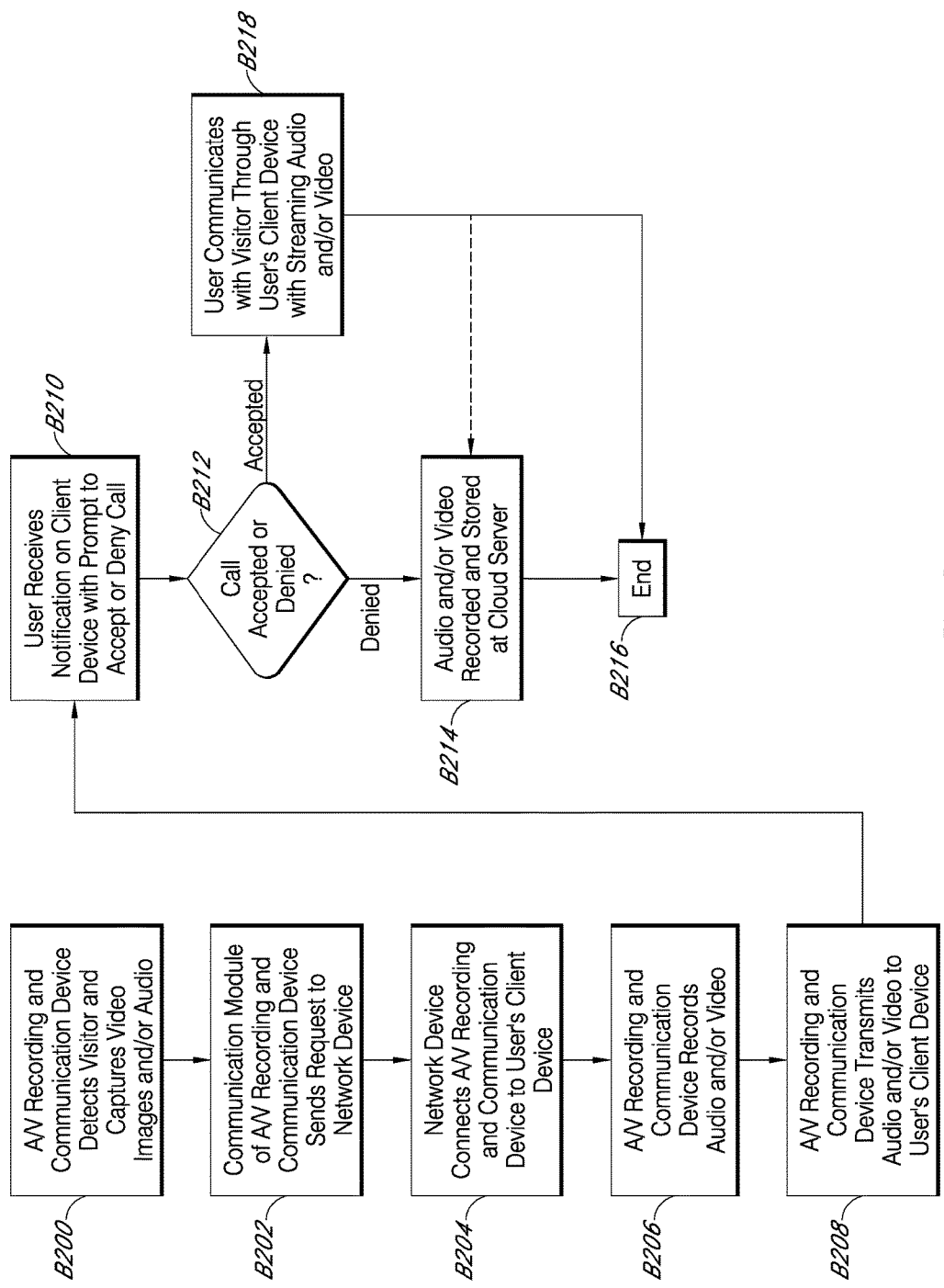
FIG. 9 is a flowchart illustrating a process for streaming and storing A/V content from an A/V recording and communication device according to various aspects of the present disclosure.

FIG. 9 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource with one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 10:
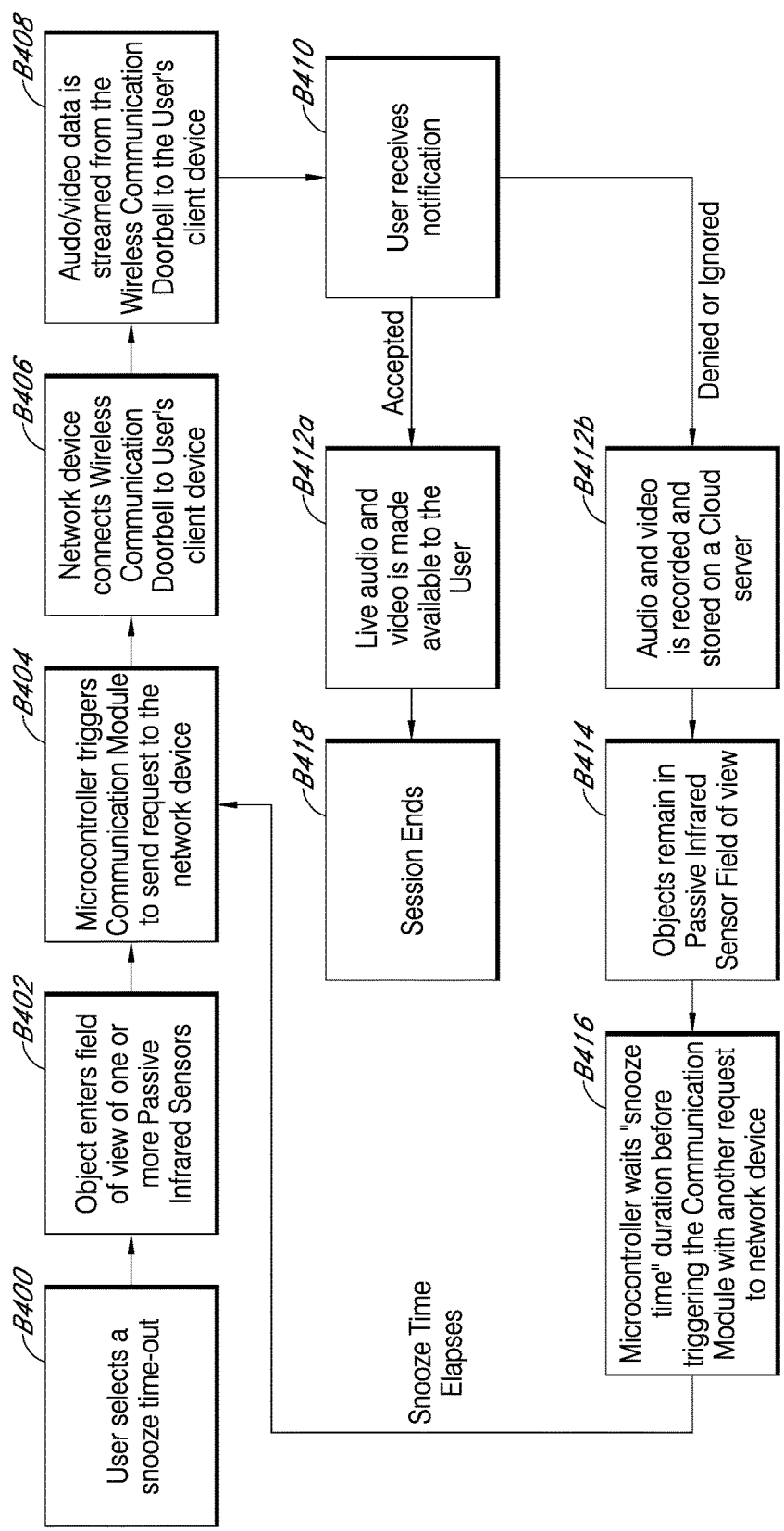
FIG. 10 is a flowchart illustrating another process for an A/V recording and communication device according to an aspect of the present disclosure.

FIG. 10 is a flowchart illustrating another process for an A/V recording and communication device according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g., a notification is either accepted or denied/ignored. For example, the user may set a snooze time-out of 15 minutes.

At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server 118.

After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130.

At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server 118 (block B412b) even if the user accepts the notification and communicates with the visitor through the user's client device 114.

Figure 11:
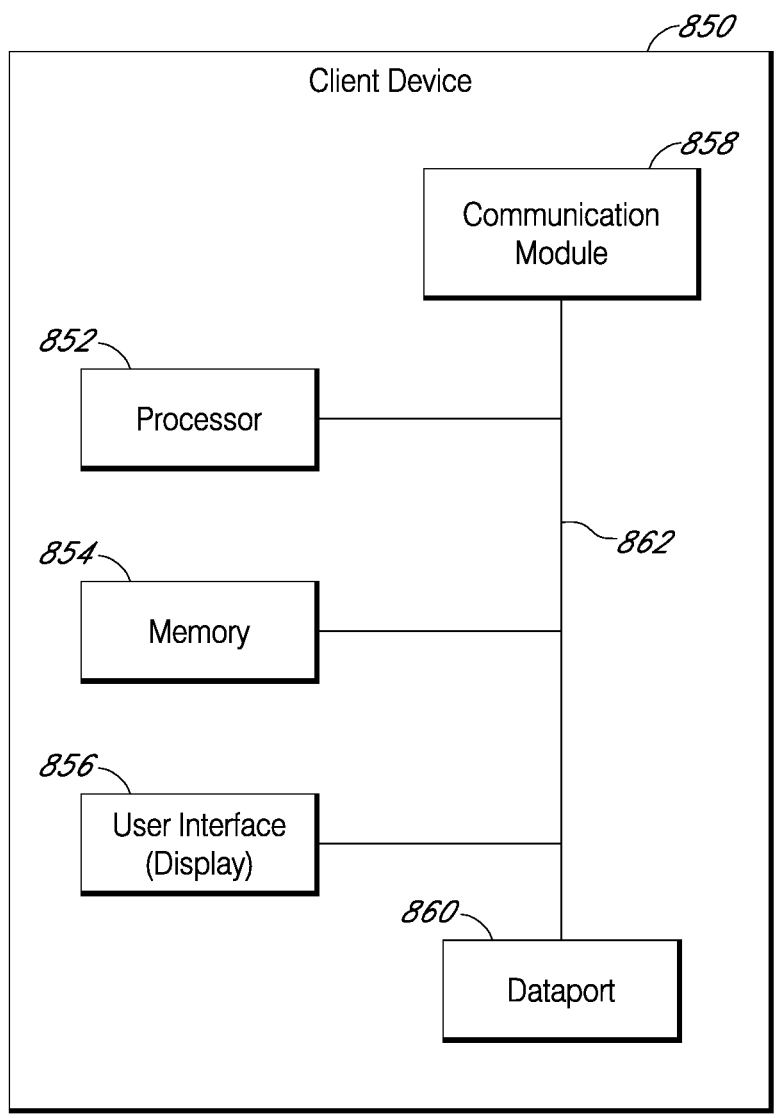
FIG. 11 is a functional block diagram of a client device on which the present embodiments may be implemented according to various aspects of the present disclosure.

FIG. 11 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a smartphone.

With reference to FIG. 11, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM).). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 808 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 12:
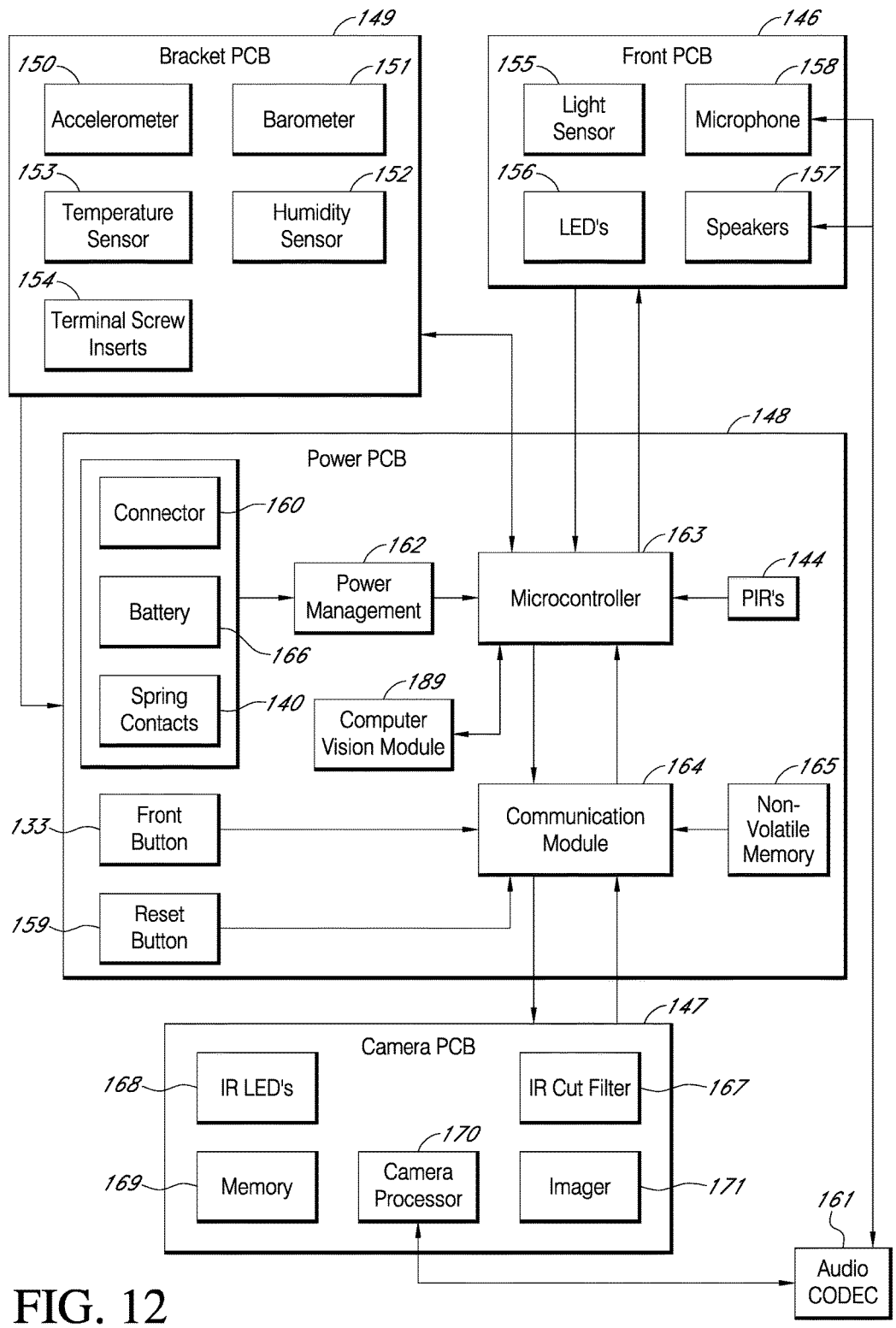
FIG. 12 a functional block diagram of the components of the A/V recording and communication device of FIG. 7.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to electrical contacts on the mounting bracket 137 (FIG. 8). The bracket PCB 149 may be electrically and/or mechanically coupled to the power PCB 148 through terminal screws, the terminal screw inserts 154, the spring contacts 140, and the electrical contacts. The terminal screws may receive electrical wires located at the surface to which the doorbell 130 is mounted, such as the wall of a building, so that the doorbell can receive electrical power from the building's electrical system. Upon the terminal screws being secured within the terminal screw inserts 154, power may be transferred to the bracket PCB 149, and to all of the components associated therewith, including the electrical contacts. The electrical contacts may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 7). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described above. When the light sensor 155 detects a low level of ambient light, the light sensor 155 may trigger the microcontroller 163 to enable "night vision.". The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described above with reference to FIG. 9. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 13:
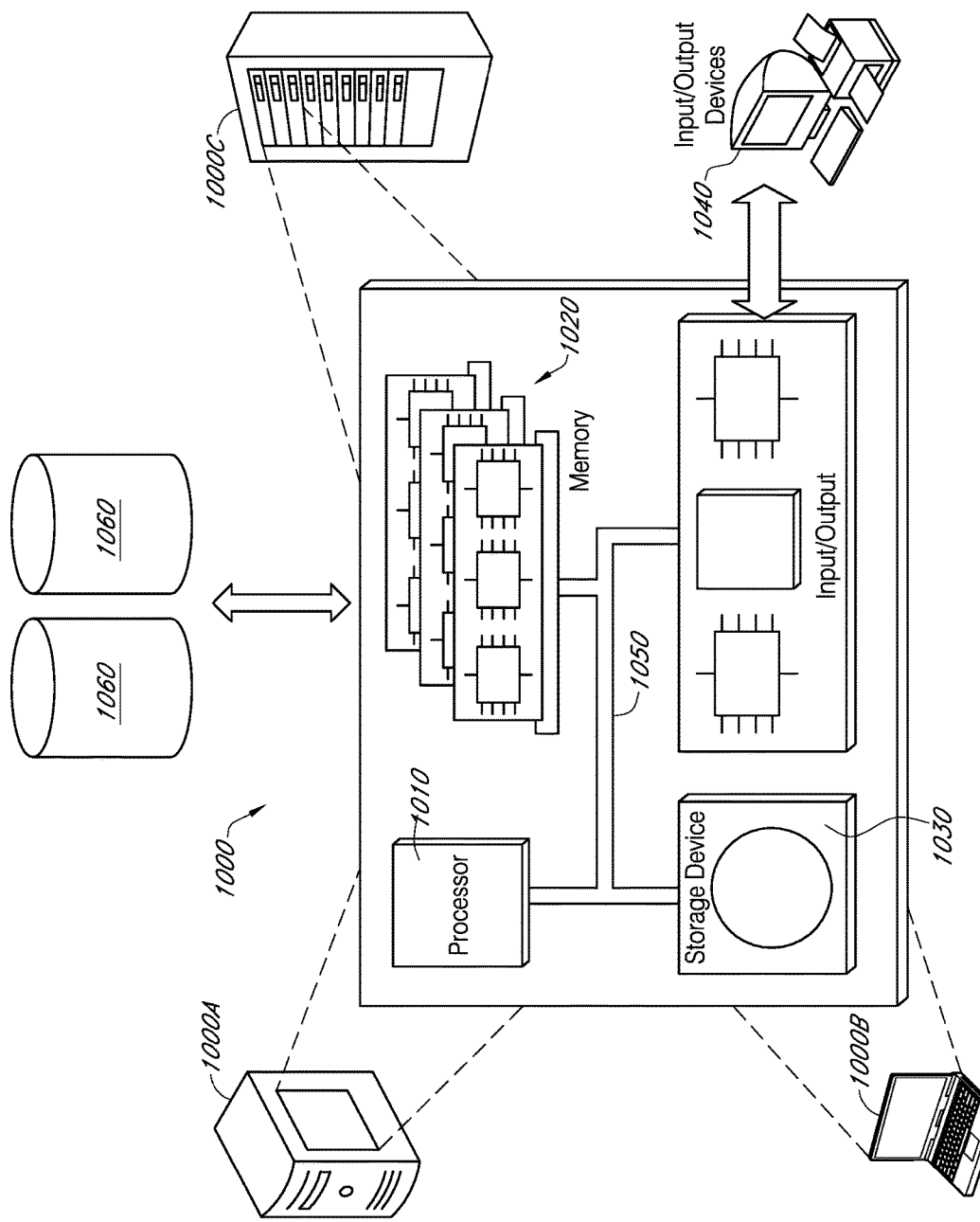
FIG. 13 is a functional block diagram of a general-purpose computing system on which the present embodiments may be implemented according to various aspects of present disclosure.

FIG. 13 is a functional block diagram of a general-purpose computing system on which the present embodiments may be implemented according to various aspects of the present disclosure. The computer system 1000 may be embodied in at least one of a personal computer (also referred to as a desktop computer) 1000A, a portable computer (also referred to as a laptop or notebook computer) 1000B, and/or a server 1000C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1000 may execute at least some of the operations described above. The computer system 1000 may include at least one processor 1010, memory 1020, at least one storage device 1030, and input/output (I/O) devices 1040. Some or all of the components 1010, 1020, 1030, 1040 may be interconnected via a system bus 1050. The processor 1010 may be single- or multi-threaded and may have one or more cores. The processor 1010 may execute instructions, such as those stored in the memory 1020 and/or in the storage device 1030. Information may be received and output using one or more I/O devices 1040.

The memory 1020 may store information, and may be a computer-readable medium, such as volatile or non-volatile memory. The storage device(s) 1030 may provide storage for the system 1000, and may be a computer-readable medium. In various aspects, the storage device(s) 1030 may be a flash memory device, a hard disk device, an optical disk device, a tape device, or any other type of storage device.

The I/O devices 1040 may provide input/output operations for the system 1000. The I/O devices 1040 may include a keyboard, a pointing device, and/or a microphone. The I/O devices 1040 may further include a display unit for displaying graphical user interfaces, a speaker, and/or a printer. External data may be stored in one or more accessible external databases 1060.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for providing a notification of a threat level associated with a person, the method comprising:
   receiving, from a camera, image data representative of one or more images of the person;
   transmitting the image data to at least one server;
   receiving, from the at least one server, a threat level associated with the person, wherein the threat level associated with the person is a measure of severity of threat posed by the person to other persons in a geographic area where the camera is located; and
   providing the notification of the threat level associated with the person.

2. The method of claim 1, wherein providing the notification of the threat level comprises providing one of a plurality of different threat level notification types based on different threat levels.

3. The method of claim 1, wherein providing the notification of the threat level comprises providing a visual notification.

4. The method of claim 3, wherein providing the visual notification comprises selecting a particular color from a set of colors for illuminating a colored light.

5. The method of claim 4, wherein each color in the set of colors corresponds to a different threat level.

6. The method of claim 1, wherein providing the notification of the threat level comprises providing an audible notification.

7. The method of claim 1, wherein providing the notification of the threat level comprises providing the notification on a client device.

8. The method of claim 7, wherein the client device is a smartphone.

9. The method of claim 1, further comprising:
   detecting a movement of the person; and
   capturing video images, by the camera, of the person.

10. The method of claim 9, wherein the image data representative of the one or more images of the person is representative of the video images of the person.

11. The method of claim 1 further comprising notifying other residents of a same neighborhood, in which the camera is located, of the threat level.

12. The method of claim 11, wherein notifying the other residents comprises notifying the other residents through streetlights located in the neighborhood.

13. An audio/video recording and communication device (A/V device), comprising:
   a camera configured to record video images of an area about the A/V device;
   one or more processors;
   a communication module configured to transmit the video images to a client device; and
   a non-transitory machine readable medium storing a program which when executed by at least one of the one or more processors provides a notification of a threat level associated with a person within a field of view of the camera, the program comprising sets of instructions for:
   receiving, from the camera, at least one video image of the person;
   transmitting the at least one video image to at least one backend server;
   receiving, from the at least one server, a threat level associated with the person, wherein the threat level associated with the person is a measure of severity of threat posed by the person to other persons in a geographic area where the A/V device is located; and
   providing the notification of the threat level associated with the person.

14. The A/V device of claim 13, wherein the program further comprises a set of instructions for providing one of a plurality of different threat level notification types based on different threat levels.

15. The A/V device of claim 13, wherein the program further comprises a set of instructions for providing a visual notification.

16. The A/V device of claim 15, wherein the A/V device is associated with a structure having at least one colored light, and wherein the program further comprises a set of instructions for selecting a particular color from a set of different colors for the colored light.

17. The A/V device of claim 16, wherein each color in the set of colors corresponds to a different threat level.

18. The A/V device of claim 13, wherein the program further comprises a set of instructions for providing an audible notification.

19. The A/V device of claim 13, wherein the program further comprises a set of instructions for providing the notification on the client device.

20. The A/V device of claim 19, wherein the client device is a smartphone.

21. The A/V device of claim 13, wherein the A/V device is a doorbell.

22. The A/V device of claim 13, wherein the A/V device is a security camera.

23. The A/V device of claim 13, wherein the program further comprises a set of instructions for:
   detecting a movement of the person within the field of view of the camera; and
   capturing the at least one video image, by the camera, of the person and a set of other objects that are within the field of view of the camera.

24. The A/V device of claim 13, wherein the program further comprises a set of instructions for notifying other persons living in a same neighborhood, in which the A/V device is located, of the threat level.

25. The A/V device of claim 24, wherein the program further comprises a set of instructions the set of instructions for notifying the for notifying the other persons through streetlights located in the neighborhood.

* * * * *